(12) United States Patent
Hiramoto et al.

(10) Patent No.: US 7,131,940 B2
(45) Date of Patent: Nov. 7, 2006

(54) MACHINE TOOL

(75) Inventors: Kazuyuki Hiramoto, Yamatokoriyama (JP); Akihiro Mochizuki, Yamatokoriyama (JP); Shunsuke Nakazawa, Yamatokoriyama (JP); Satoshi Matsui, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/366,680

(22) Filed: Mar. 3, 2006

(65) Prior Publication Data

US 2006/0148626 A1 Jul. 6, 2006

Related U.S. Application Data

(62) Division of application No. 10/891,491, filed on Jul. 15, 2004.

(30) Foreign Application Priority Data

| Jul. 15, 2003 | (JP) | ............................... 2003-197386 |
| Jul. 15, 2003 | (JP) | ............................... 2003-197387 |
| Jul. 15, 2003 | (JP) | ............................... 2003-197388 |

(51) Int. Cl.
*B23Q 3/157* (2006.01)

(52) U.S. Cl. ..................... 483/39; 483/38; 483/40; 483/41; 409/202; 409/212

(58) Field of Classification Search .................. 483/38, 483/39, 40, 41; 409/202, 212
See application file for complete search history.

(56) References Cited

U.S. PATENT DOCUMENTS

| 765,447 | A | | 7/1904 | Van |
| 1,937,408 | A | | 11/1933 | Johnson |
| 2,169,484 | A | | 8/1939 | Armitage |
| 2,370,764 | A | | 3/1945 | Armitage et al. |
| 2,393,696 | A | | 1/1946 | Kraut et al. |
| 2,400,819 | A | | 5/1946 | Gallimore et al. |
| 2,434,751 | A | | 1/1948 | Trecker et al. |
| 3,027,813 | A | | 4/1962 | Seborg |
| 3,274,891 | A | | 9/1966 | Rollat |
| 3,344,512 | A | * | 10/1967 | Zucchellini ................... 483/62 |
| 3,587,389 | A | | 6/1971 | Kreimer |
| 4,514,892 | A | * | 5/1985 | Tsujimura et al. ............ 483/56 |
| 5,125,139 | A | | 6/1992 | Ohta |

(Continued)

FOREIGN PATENT DOCUMENTS

JP 2001025936 A * 1/2004

*Primary Examiner*—Monica Carter
*Assistant Examiner*—Eric A. Gates
(74) *Attorney, Agent, or Firm*—Smith Patent Office

(57) ABSTRACT

The present invention provides a machine tool whose width dimension is not increased even when it includes a tool magazine. The present invention includes: a bed; a saddle disposed on the bed to be movable in a forward and backward (Y-axis) direction in a front view of the machine tool; a table disposed on the saddle to be movable in right and left (X-axis) direction; a column fixed on the bed a spindle head disposed on the column to support a spindle and movable in a vertical (Z-axis) direction; an automatic tool changer disposed on a back face side of the column, wherein the column has an opening which allows the back face side and a front face side of the column to communicate with each other, and the automatic tool changer replaces a tool on the spindle side by a tool on a tool magazine side through the opening.

5 Claims, 9 Drawing Sheets

U.S. PATENT DOCUMENTS

| | | |
|---|---|---|
| 5,592,728 A | 1/1997 | Susnjara |
| 5,611,137 A | 3/1997 | Braun |
| 5,678,291 A | 10/1997 | Braun |
| 6,068,431 A | 5/2000 | Line |
| 6,070,312 A | 6/2000 | Mantovani |
| 6,186,711 B1 | 2/2001 | Muller |
| 6,665,580 B1 | 12/2003 | Susnjara |

* cited by examiner

FRONT OF MACHINE

MACHINE TOOL

CROSS REFERENCE TO RELATED APPLICATION

This application is a divisional application of U.S. patent application Ser. No. 10/891,491 filed on Jul. 15, 2004, currently pending. The disclosure of U.S. patent application Ser. No. 10/891,491 is hereby incorporated by reference.

BACKGROUND OF THE INVENTION

1. Field of the Invention

The present invention relates to a machine tool that machines a workpiece while moving a vertically set spindle and the workpiece relatively to each other in X-axis, Y-axis, and Z-axis directions.

2. Description of the Related Art

For example, a vertical machining center that machines a workpiece using a table movable in X-axis and Y-axis directions and a spindle movable in a Z-axis direction is generally structured, as shown in FIG. 10, to include: a column 61 fixedly disposed on a back end of a fixed bed 60 when seen from a front side of the machine; a saddle 62, for placing a workpiece W thereon, disposed on a front part of the fixed bed 60 to be movable in the Y-axis direction (forward and backward direction); a table 63 disposed on the saddle 62 to be movable in the X-axis direction (right and left direction); and a spindle head 65, with a spindle 64 attached thereto, disposed on a front face of the column 61 to be movable in the Z-axis direction (vertical direction).

In some conventional vertical machining centers of this type, a tool magazine 66 of an automatic tool changer is disposed on a side face of the column 61 for replacing a preceding working tool T attached to the spindle 64 by a subsequent working tool housed in the tool magazine 66.

SUMMARY OF THE INVENTION

A problem of the above-described conventional machine, in which the tool magazine is disposed on the side face of the column, is that the width dimension of the machine is naturally increased.

It is an object of the present invention to provide a machine tool whose width dimension is not increased even when it includes a tool magazine.

In an invention, a machine tool includes: a bed; a saddle disposed on the bed to be movable in a forward and backward (Y-axis) direction in a front view of the machine tool; a table disposed on the saddle to be movable in right and left (X-axis) direction; a column fixed on the bed; a spindle head disposed on the column to support a spindle and movable in a vertical (Z-axis) direction; an automatic tool changer disposed on a back face side of the column, wherein the column has an opening which allows the back face side and a front face side of the column to communicate with each other, and the automatic tool changer replaces a tool on the spindle side by a tool on a tool magazine side through the opening.

In the invention, the automatic tool changer is disposed on the back face side of the column and it replaces the tool on the spindle side by the tool on the tool magazine side through the opening allowing the back face side and the front face side of the column to communicate with each other, so that it is possible to utilize a vacant space on the back face of the column for disposing the tool magazine. This can prevent the increase in the width dimension of the machine.

In a preferable embodiment of the invention, the column has a shape of a gate that is bridged over a travel range of the table and has right and left legs and a beam connecting tops of the right and left legs, and the automatic tool changer is disposed on a back face side of the beam of the column and passes under a lower edge of the beam to replace the tool on the spindle side by the tool on the tool magazine side.

In the above-described embodiment, the column has the shape of the gate bridged over the travel range of the table with the beam connecting the tops of the right and left legs, so that it is possible to effectively utilize, for tool replacement, a machining opening under the column tool. This eliminates the need for separately saving a space for tool replacement, so that the overall machine tool can be made compact.

In another preferable embodiment of the invention, the beam of the column is displaced from the right and left legs toward a back face side of the machine tool and is set above the bed at a substantially center portion of the bed in terms of the Y-axis direction.

In the above-described embodiment, since the beam of the column is displaced from the right and left legs toward the back face side of the machine tool and is set at the substantially center portion of the bed in terms of the Y-axis direction, it is possible to effectively utilize a vacant space of the back face side of the beam for disposing the tool magazine, so that the overall machine tool can be made compact.

In still another preferable embodiment of the invention, the automatic tool changer includes: a tool magazine disposed on the back face of the beam of the column; a change arm shaft vertically passing through the beam; a change arm turnably connected to a lower end of the change arm shaft; a change arm turn driving unit connected to an upper end of the change arm shaft; and a tool transfer mechanism disposed in parallel to the change arm shaft to transfer a tool between the tool magazine and the change arm.

In the above-described embodiment, the change arm shaft is disposed to vertically pass through the beam and the tool transfer mechanism is disposed in parallel to the change arm shaft, so that it is possible to dispose a tool change unit on the back face side of the beam with reduced installation space necessary.

BRIEF DESCRIPTION OF THE DRAWINGS

The structure, operation, and effect of the present invention will be detailed in an embodiment based on the following attached drawings.

DETAILED DESCRIPTION OF THE PREFERRED EMBODIMENT

An embodiment of the present invention will be hereinafter described based on the attached drawings.

Figure 1:
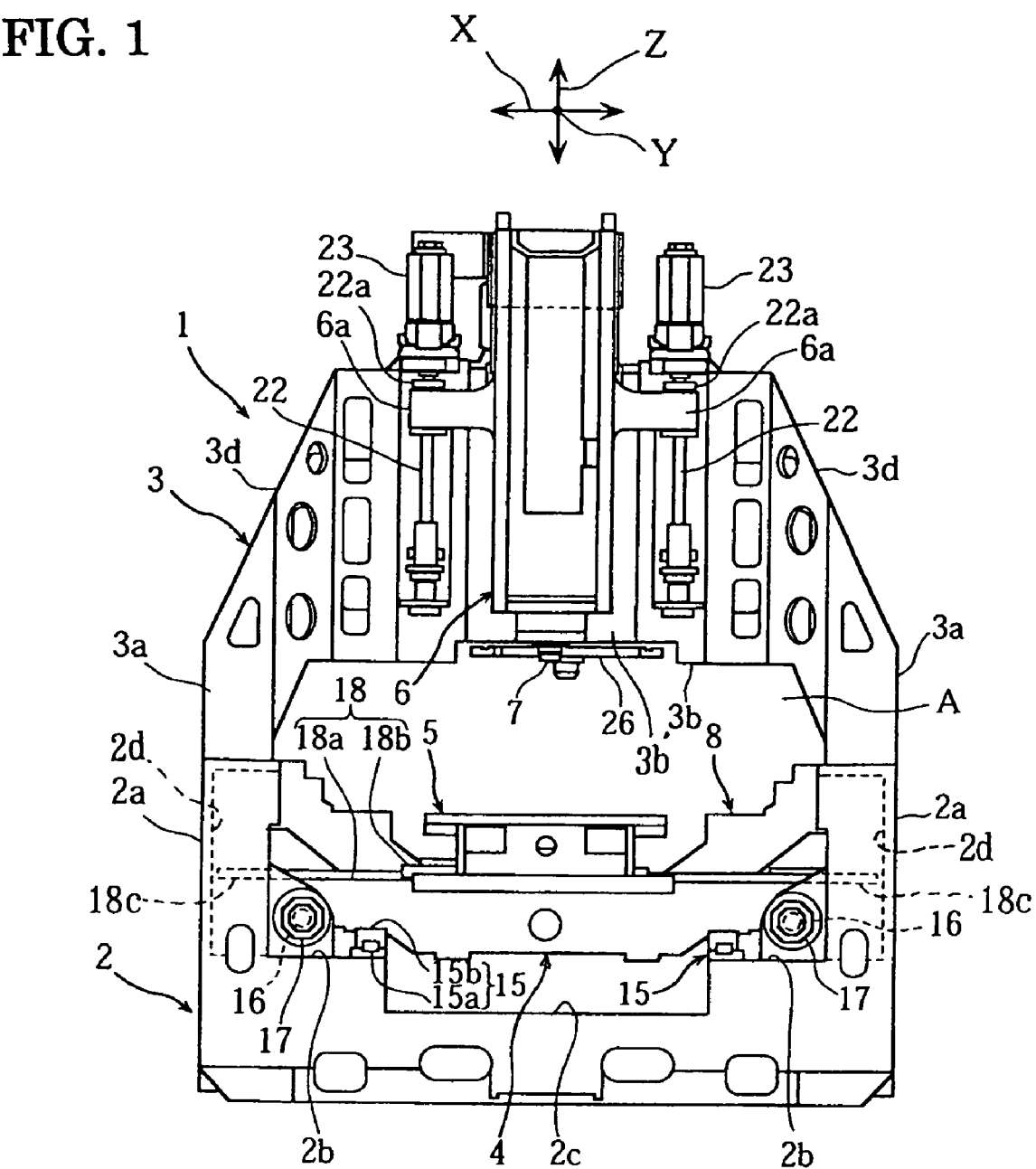
FIG. 1 is a front view to explain a vertical machining center according to an embodiment of the present invention.
Figure 2:
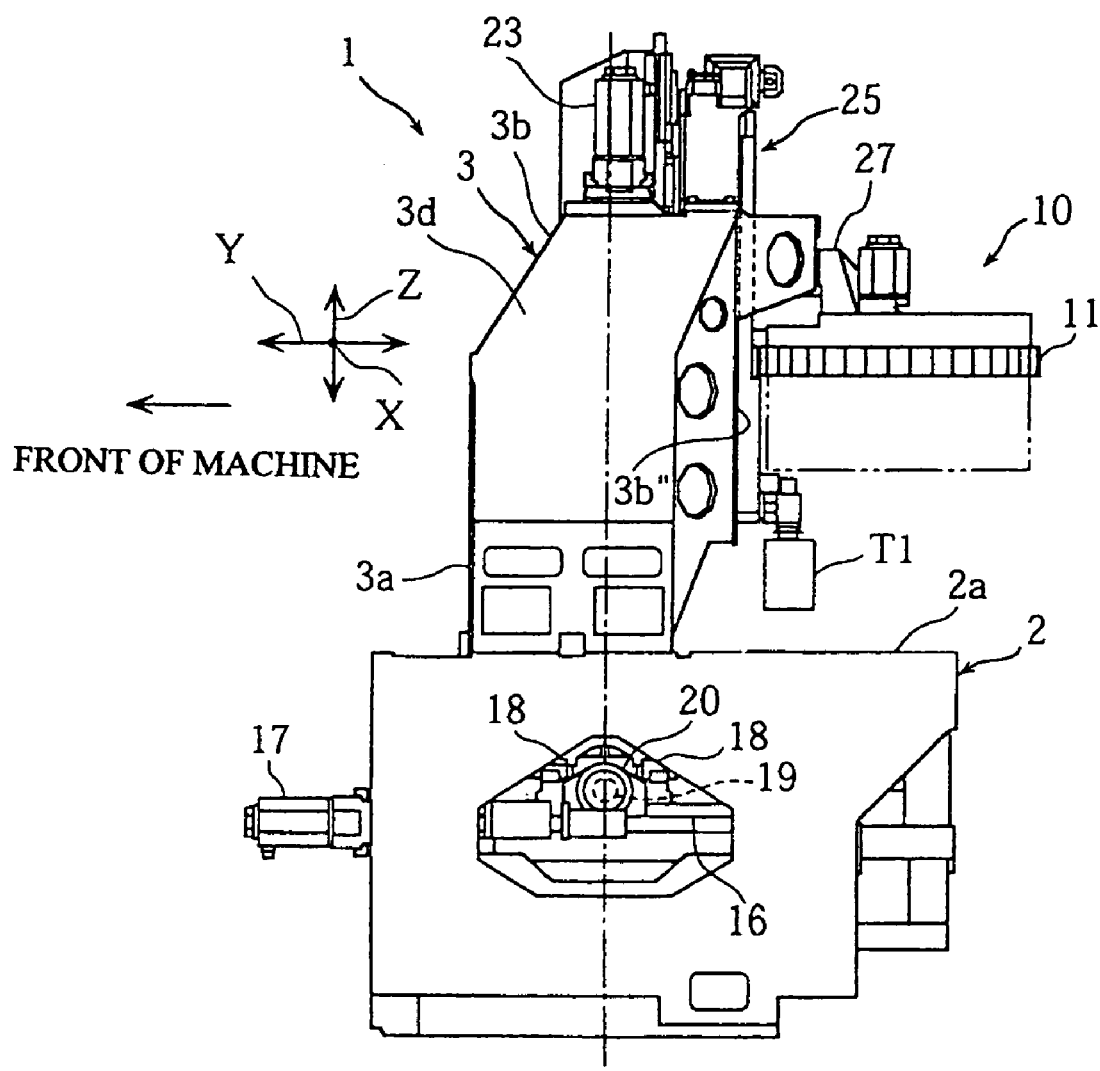
FIG. 2 is a right side view of the vertical machining center.
Figure 3:
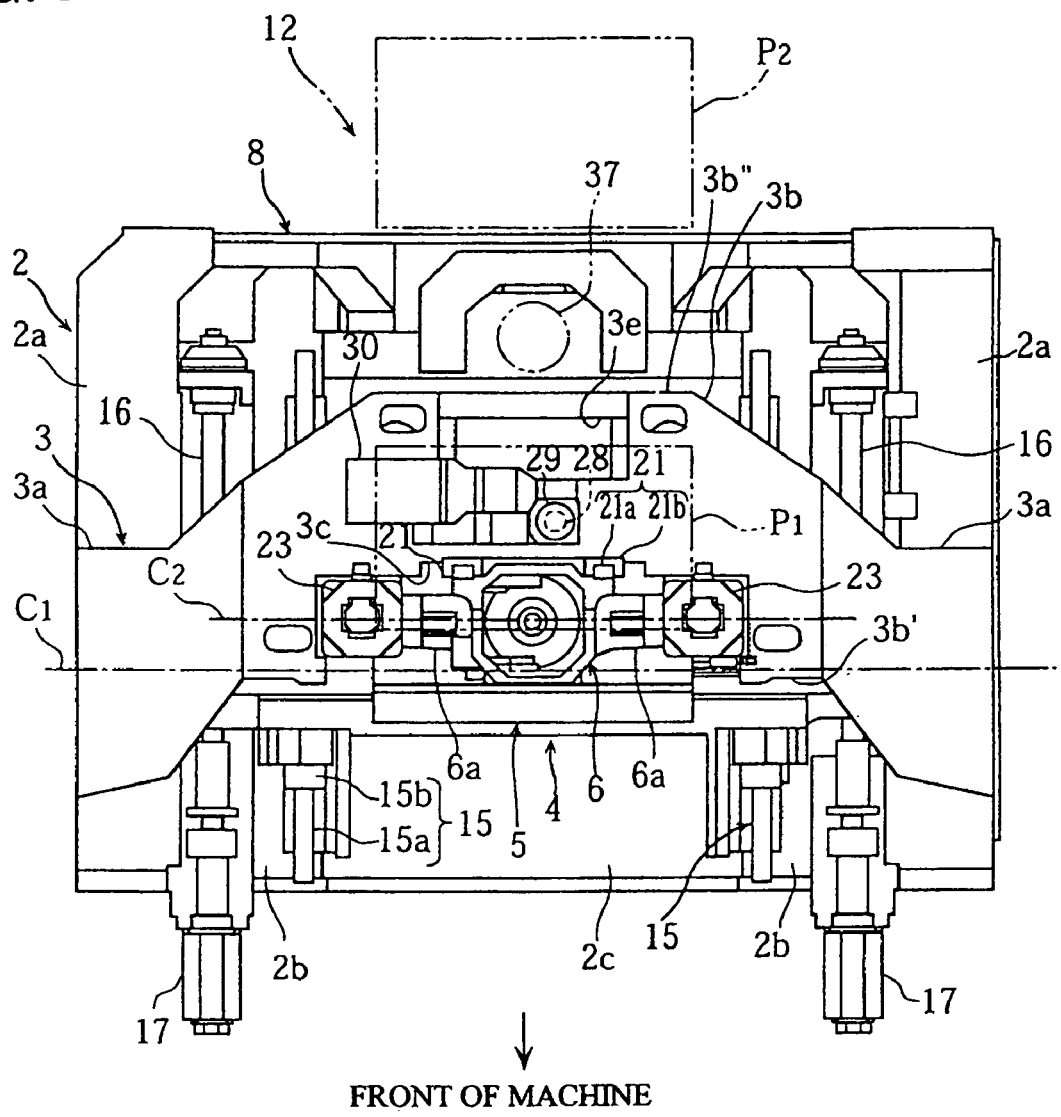
FIG. 3 s a plane view of the vertical machining center.
Figure 4:
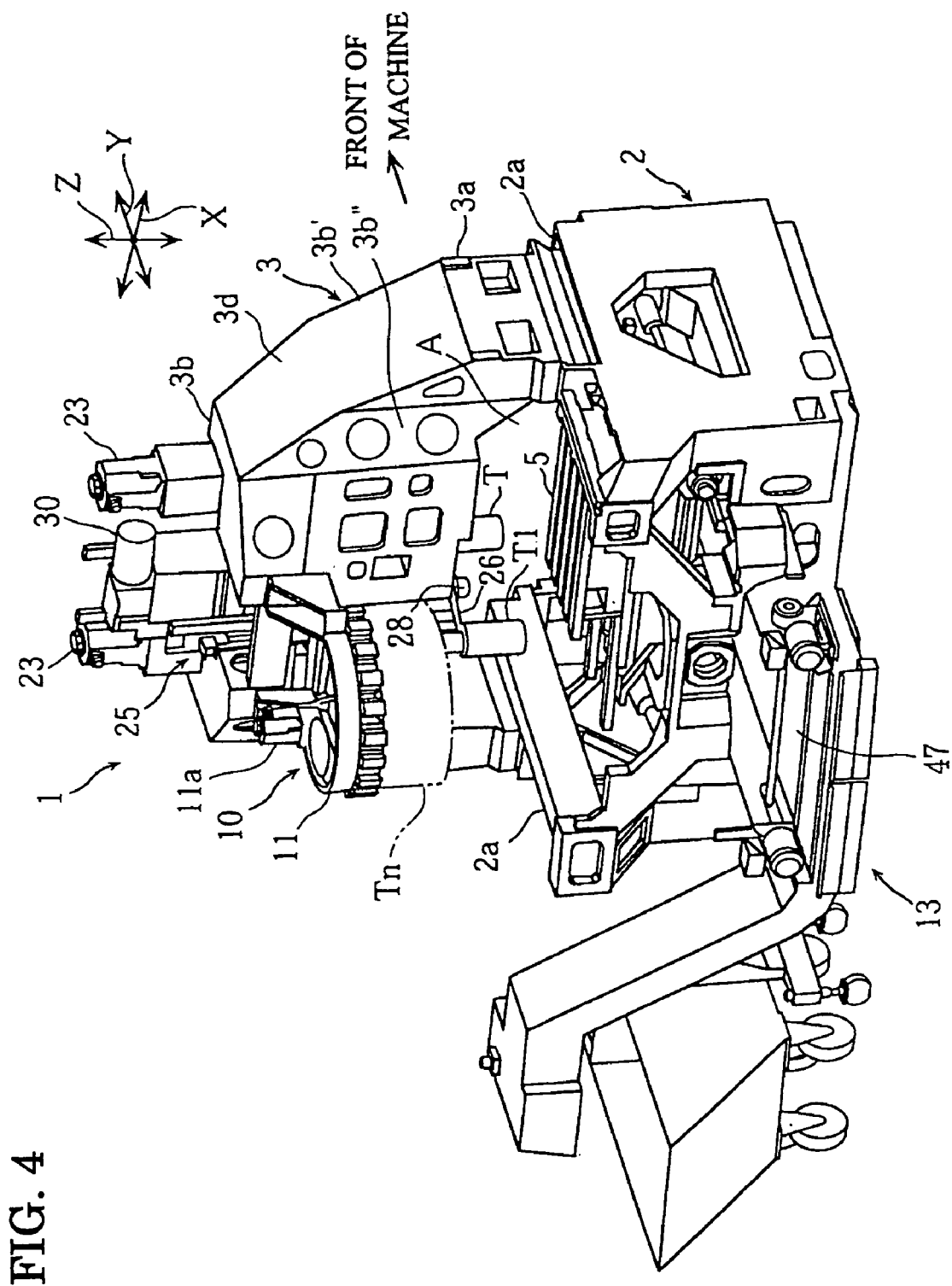
FIG. 4 is a rear perspective view of the vertical machining center.
Figure 5:
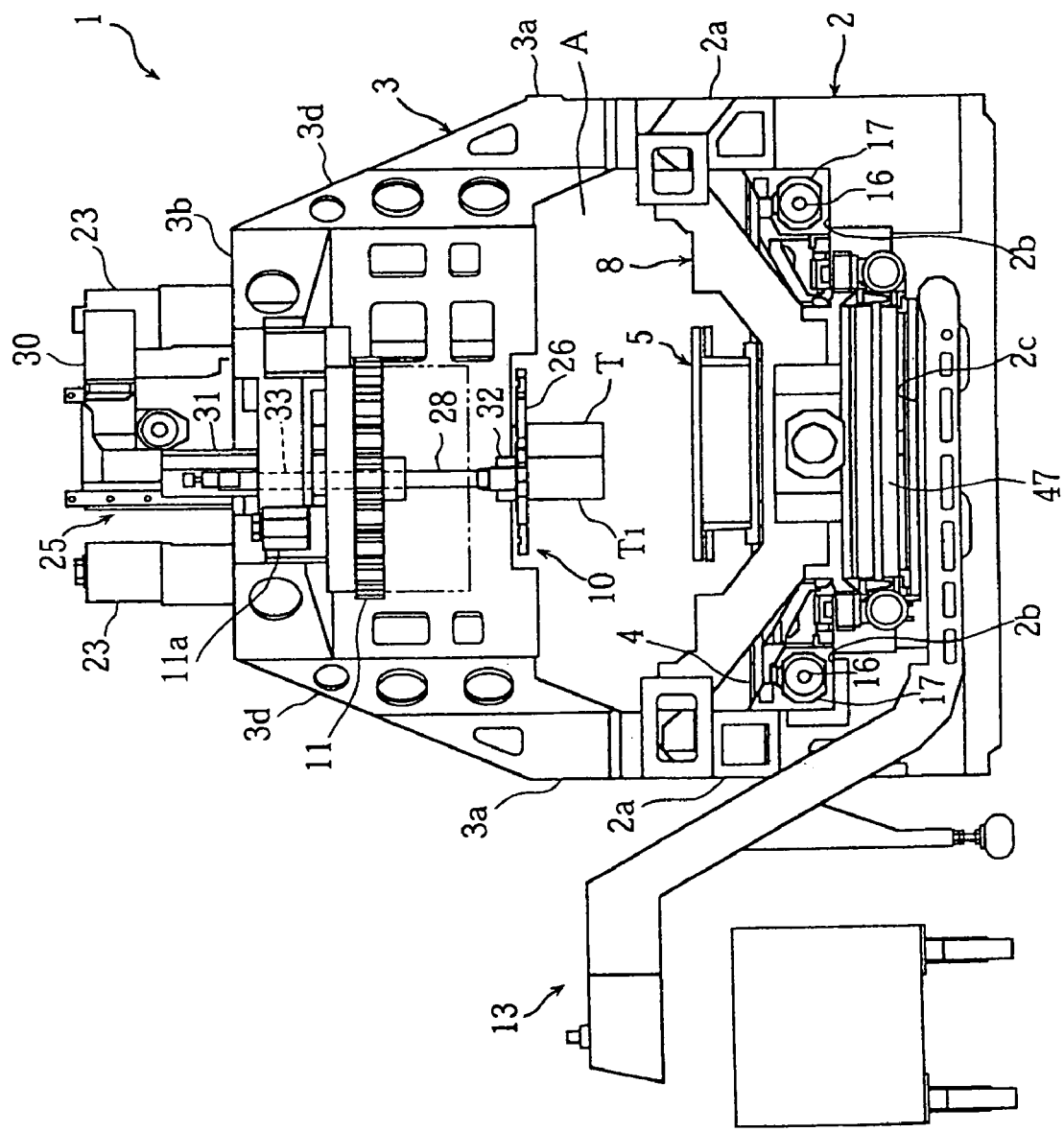
FIG. 5 is a rear view of the vertical machining center.
Figure 6:
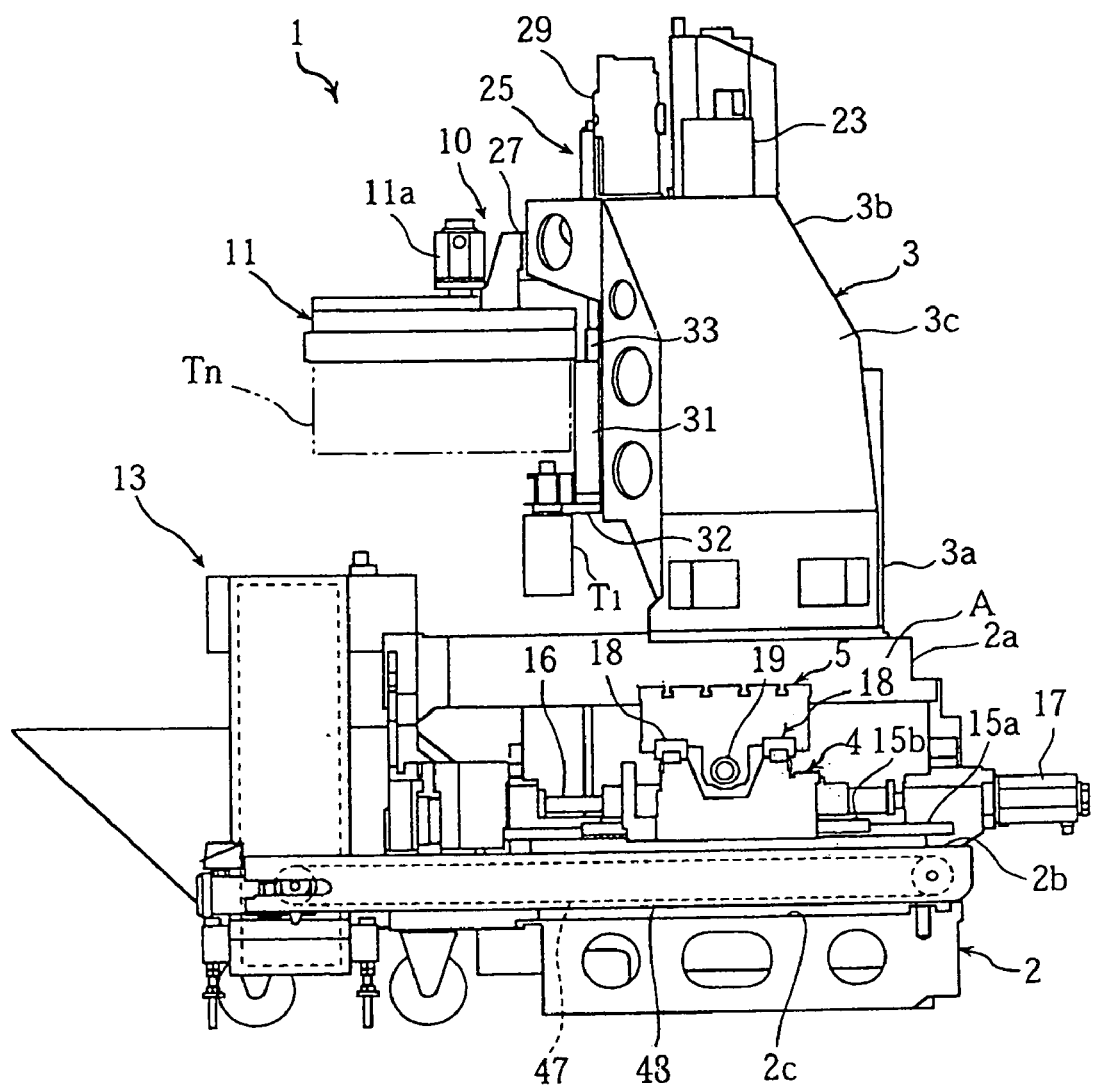
FIG. 6 is a left side view of the vertical machining center.
Figure 7:
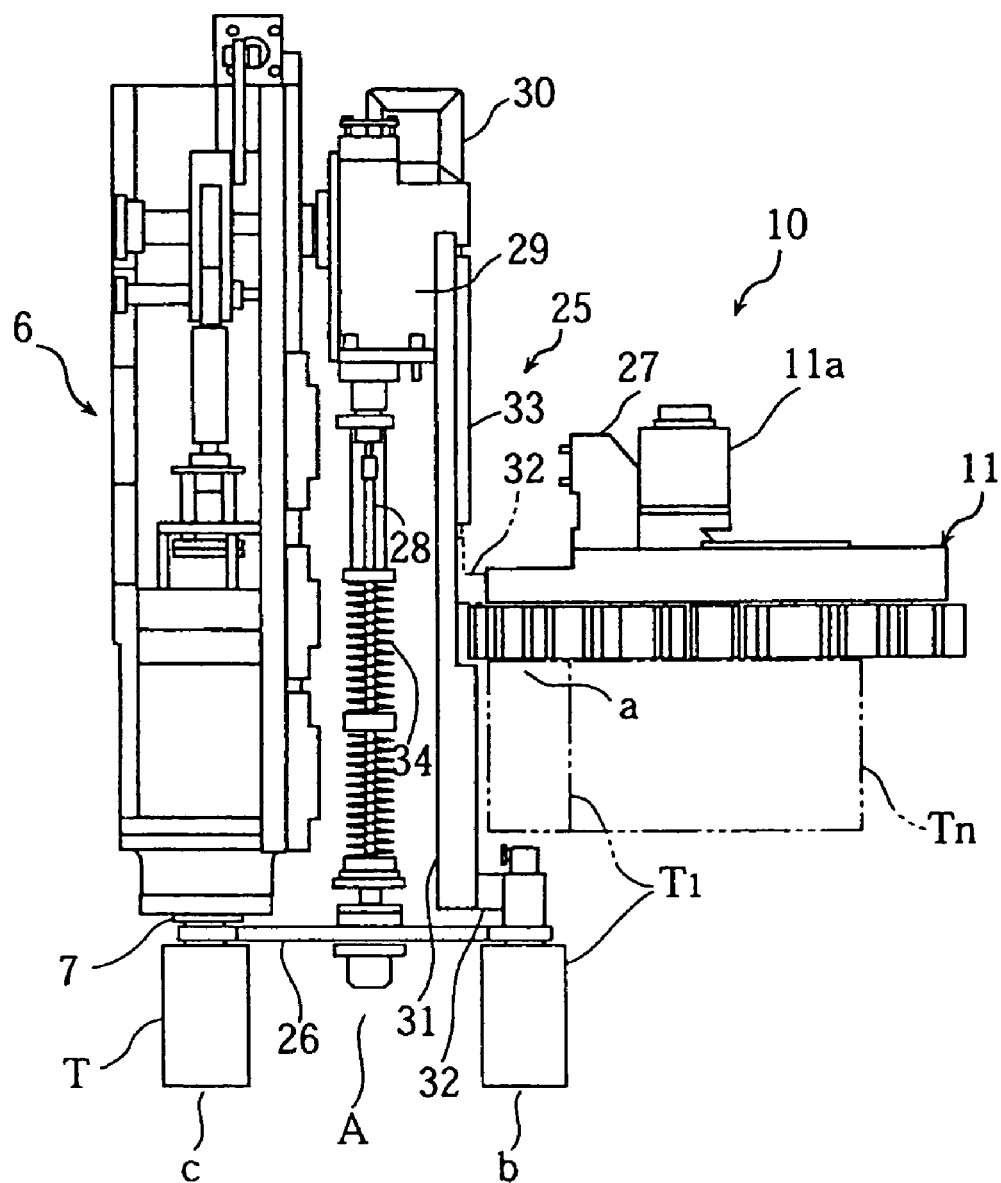
FIG. 7 is a side view showing the structure of a tool changer provided in the vertical machining center.
Figure 8:
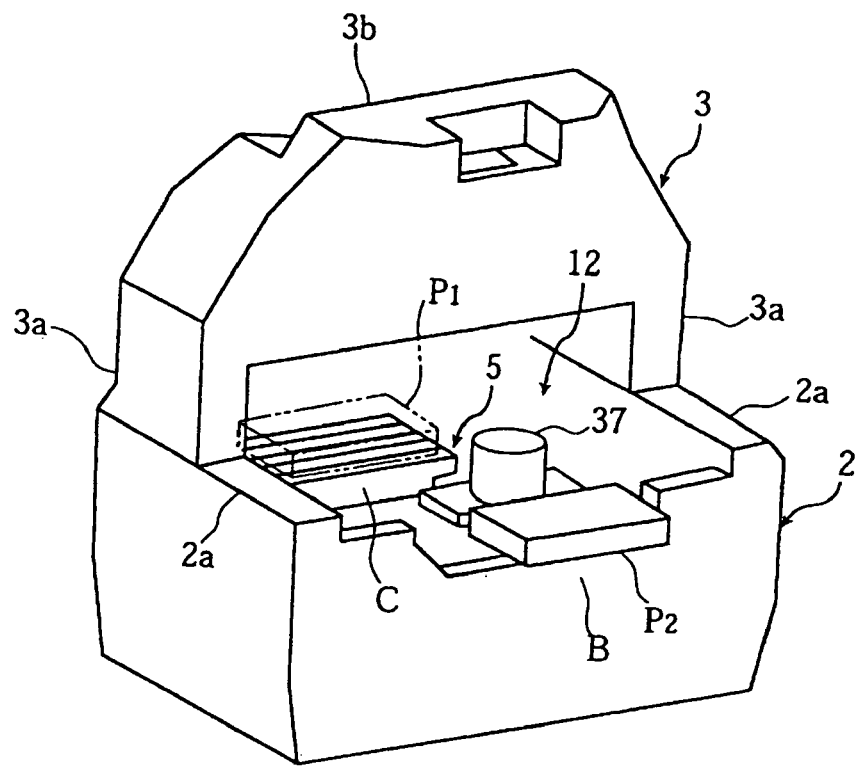
FIG. 8 is a schematic perspective view of a workpiece changer of the vertical machining center.
Figure 9:
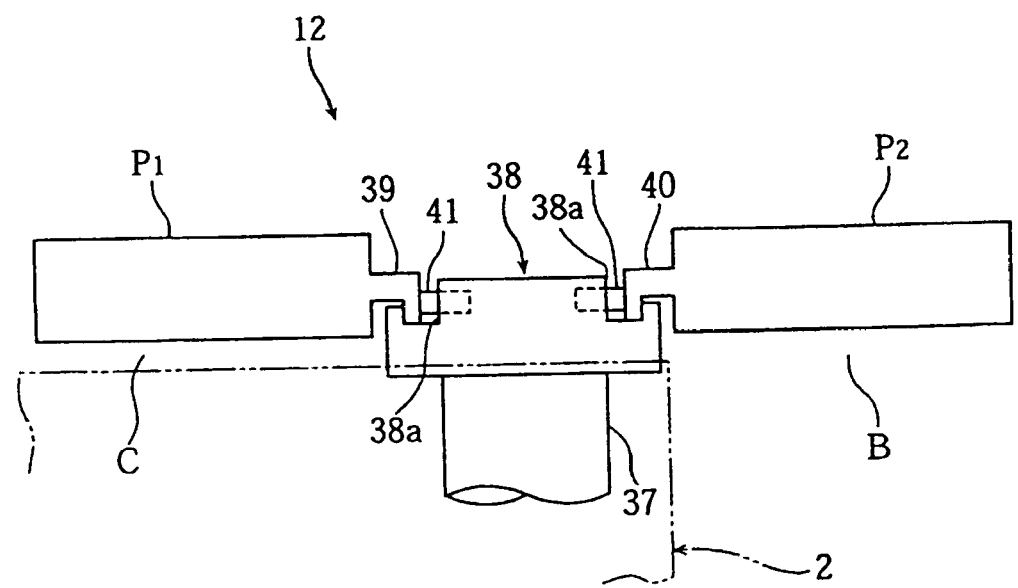
FIG. 9 is a schematic side view of the workpiece changer.
Figure 10:
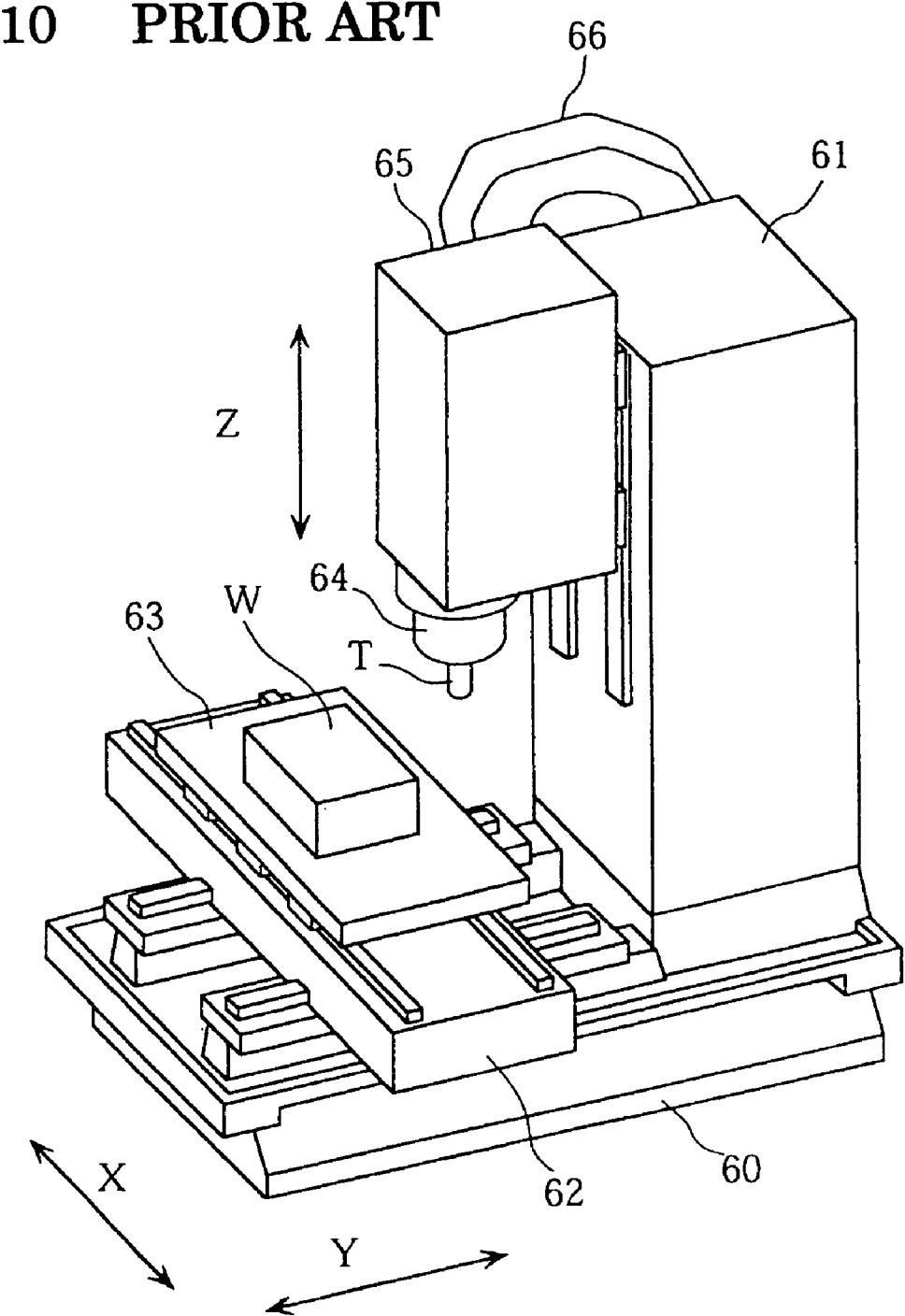
FIG. 10 is a schematic view of a typical vertical machining center of a conventional art.

FIG. 1 to FIG. 9 show a vertical machining center 1. The machining center 1 includes a gate-shaped column 3 fixed on a substantially center portion of a fixed bed 2 in terms of a forward and backward direction, a saddle 4 disposed under the column 3 to be movable in a Y-axis (forward and backward) direction, a table 5 disposed on the saddle 4 to be movable in an X-axis (right and left) direction, and a spindle head 6 disposed on a front face of the column 3 to be movable in a Z-axis (vertical) direction. A spindle 7 is rotatably supported by a lower end of the spindle head 6, and a tool T is detachably attached to the spindle 7.

In the vertical machining center 1 described above, a workpiece (not shown) placed on the table 5 is machined by the tool T while the workpiece and the spindle 7 are moved relatively to each other, the workpiece moving in the X-axis and Y-axis directions and the spindle 7 moving in the Z-axis direction.

On a back face side of the fixed bed 2, mounted is a workpiece changer 12 that turns 180 degrees a preceding process pallet P1 on which a machined workpiece is placed and a subsequent process pallet P2 on which a subsequently machined workpiece is placed, via a turn shaft 37, thereby automatically replacing these pallets P1, P2. Further, a chip disposer 13 is provided on a bottom of the fixed bed 2. The chip disposer 13 includes a conveyor 47 and a coolant tank 48, the conveyor 47 collecting a cutting fluid supplied to a workpiece machining portion and discharging chips produced by workpiece machining out of the machine.

The fixed bed 2 includes right and left vertical walls 2a, 2a, saddle supports 2b, 2b formed in a stepped shape inside the right and left vertical walls 2a, and a substantially flat bottomed recession 2c stepped down from the right and left saddle supports 2b. This bottomed recession 2c is positioned at a center portion of the bed 2 in terms of the X-axis direction with a back face side and an upper face side thereof opened. The right and left vertical walls 2a on the back face side of the fixed bed 2 are coupled to each other with a cross member 8.

Right and left Y-axis guide rails 15 supportingly guiding the saddle 4 in the Y-axis direction extend along inner edges of the right and left saddle supports 2b. Each of the Y-axis guide rails 15 includes a rail 15a fixed to the saddle support 2b and a guide 15b fixed to a bottom face of the saddle 4, the rail 15a and the guide 15b being slidably fitted to each other.

Further, right and left Y-axis ball screws 16, 16 for driving the movement of the saddle 4 in the Y-axis direction are rotatably fixed to outer sides of the respective Y-axis guide rails 15 on the right and left saddle supports 2b, and Y-axis drive motors 17, 17 for driving the rotation of the ball screws 16 are connected to front ends of the respective Y-axis ball screws 16.

A pair of front and back X-axis guide rails 18, 18 for supportingly guiding the table 5 in the X-axis direction are disposed on a top face of the saddle 4. Each of the X-axis guide rails 18 includes a rail 18a fixed to the saddle 4 and a guide 18b fixed to a bottom face of the table 5, the rail 18a and the guide 18b being slidably fitted to each other.

Between the front and back X-axis guide rails 18 on the top face of the saddle 4, one X-axis ball screw 19 for driving the movement of the table 5 in the X-axis direction is rotatably fixed, and an X-axis drive motor 20 for driving the rotation of the ball screw 19 is connected to a left end of the X-axis ball screw 19.

A pair of right and left Z-axis guide rails 21, 21 for supportingly guiding the spindle head 6 in the Z-axis direction is disposed on the front face of the column 3. Each of the Z-axis guide rails 21 includes a rail 21a fixed to a back face of the spindle head 6 and a guide 21b fixed to the front face of the column 3, the rail 21a and the guide 21b being slidably fitted to each other.

Right and left Z-axis ball screws 22, 22 for driving the movement of the spindle head 6 in the Z-axis direction are rotatably fixed on outer sides of the respective Z-axis guide rails 21 on the front face of the column 3, and Z-axis drive motors 23, 23 for driving the rotation of the ball screws 22 are connected to upper ends of the respective Z-axis ball screws 22.

The spindle head 6 has arms 6a, 6a extending in the right and left directions, and nuts 22a fitted to the Z-axis ball screws 22 are attached to the right and left arms 6a.

The column 3 is formed integrally by casting and has a shape of a gate that is bridged over an X-axis and Y-axis travel range of the table 5 in a front view of the machine and has right and left legs 3a, 3a and a beam 3b integrally connecting tops of the right and legs 3a. The right and left legs 3a are fixed on top faces of the right and left vertical walls 2a of the fixed bed 2. In this structure, a machining opening A which is opened in the Y-axis direction and whose width in the X-axis direction is wide is formed under the column 3.

In a front view of the machine, the right and left legs 3a are inclined so that upper portions 3d of the legs 3a are positioned closer to the spindle head 6 and form a substantially triangular shape with the spindle head 6 side having larger vertical dimension. Further, the beam 3b are formed in a square shape with an upper edge and an open lower edge thereof being substantially parallel to each other.

In a plane view of the machine, the column 3 is formed in a substantially arch shape so that the beam 3b is displaced from the right and left legs 3a, 3a toward the back face side of the machine, and a front face 3b' of the beam 3b substantially coincides with a leg center line C1 passing through the centers of the right and left legs 3a in terms of the forward and backward direction. Further, the beam 3b is positioned at a center of the fixed bed 2 in terms of the Y-axis direction, and the right and left legs 3a are positioned on a front side thereof. A housing recession 3c for housing the spindle head 6 and the right and left Z-axis ball screws 22 is formed on the front face 3b' of the beam 3b. This structure eliminates the overhang of the spindle head 6 from the column 3.

Side wall recessions 2d recessed outward in the right and left directions of the machine are formed in the right and left vertical walls 2a of the bed 2 respectively. Ends 18c of the X-axis guide rails 18 are positioned in the right and left side wall recessions 2d respectively.

A tool changer 10 for automatically replacing a preceding working tool T attached to the spindle 7 by a subsequent working tool T1 attached to the tool magazine 11 through the opening A of the column 3 is mounted on the column 3.

The tool changer 10 includes: the tool magazine 11 in a circular shape that vertically holds a large number of tools Tn by a pot with the tools Tn facing downward and drives the turn of the subsequent working tool T1 for indexing at a tool indexing position "a"; a tool transfer mechanism 25 that transfers the subsequent working tool T1 indexed at the indexing position "a" to a tool change position "b" and returns the preceding working tool T, which is returned to the tool change position "b", to the tool magazine 11; and a change arm 26 replacing the preceding working tool T, which is transferred to a tool change position "c" by the spindle 7, by the subsequent working tool T1 transferred to the tool change position "b".

The tool magazine 11 is disposed on a back face 3b'' of the beam 3b of the column 3 and is suspendedly supported by a bracket 27 fixed to the back face 3b''. Note that 11a denotes a turn indexing motor.

A change arm shaft 28 is insertedly disposed on a back side of the spindle head 6 on the beam 3b so as to vertically pass through the beam 3b. The change arm 26 is connected to a bottom end of the change arm shaft 28, and a turn driving unit 29 for driving the change arm 26 to turn 180 degrees is connected to an upper end of the change arm shaft 28. A drive motor 30 is connected to the turn driving unit 29. A balance spring 34 constantly biases the change arm shaft 28 upward to cancel the weight of the tool.

The tool transfer mechanism 25 includes: a direct acting guide 31 disposed in a rectangular hole 3e (see FIG. 3) formed on a back side of the change arm shaft 28 in the beam 3b to be parallel to the change arm shaft 28; a hook 32 supported by the direct acting guide 31 to be vertically movable and gripping the pot of the subsequent working tool T1; and an air cylinder 33 for driving the hook 32 to move up/down between the tool indexing position "a" and the tool change position "b".

The change arm 26 is kept on standby under the lower edge of the beam 3b with its longitudinal direction aligned with the X-axis direction. Then, the change arm 26 replaces the preceding working tool T on the front face 3b' side of the beam 3b by the subsequent working tool T1 on the back face 3b'' side thereof through the opening A of the column 3.

When the workpiece machining is finished, the spindle head 6 moves in the Z-axis direction to locate the preceding working tool T at the tool change position "c", and the tool magazine 11 turns and indexes the subsequent working tool T1 to locate it at the tool indexing position "a". The hook 32 grips the pot of the subsequent working tool T1 indexed at the tool indexing position "a", and the air cylinder 33 transfers the subsequent working tool T1 together with the hook 32 to the tool change position "b" to locate it at this change position "b". The change arm 26 turns from the standby position to grip the preceding working tool T as well as the subsequent working tool T1, moves down in this state to take out the tools T, T1, turns 180 degrees, and thereafter moves up. Through this operation, the preceding working tool T is placed in a pot kept on standby at the tool change position "b", and the subsequent working tool T1 is attached to the spindle 7. The preceding working tool T is lifted together with the hook 32 to be returned to the tool magazine 11.

The workpiece changer 12 is roughly structured such that a clamp 38 is fixed to an upper end of the turn shaft 37 disposed to be ascendible/descendible and turnable 180 degrees. The clamp 38 has grooves 38a, 38a fittable to hooks 39, 40 formed in the aforesaid pallets P1, P2, and hydraulic pistons 41, 41 are disposed in the respective grooves 38a to be projectable/retreatable. When the hydraulic pistons 41 protrude into the grooves 38a, the pallets P1, P2 are clamped and when they retreat out of the grooves 38a, the pallets P1, P2 are unclamped.

The subsequent process pallet P2 is positioned at a workpiece standby position B that is set outside the machine on a back face side of the fixed bed 2, and the preceding process pallet P1 is positioned at a workpiece change position C that is set under the column 3. Further, the turn shaft 37 is disposed on a back end of the fixed bed 2.

A subsequent machined workpiece is placed in the subsequent process pallet P2 at the workpiece standby position B in advance. When workpiece machining is finished, the table 5 moves in the X-axis and Y-axis directions to transfer the preceding process pallet P1 to the workpiece change position C. The turn shaft 37 moves up, the hooks 39, 40 of the pallets P1, P2 are fitted in the respective grooves 38a, and the hydraulic pistons 41 protrude to clamp the pallets P1, P2. The turn shaft 37 further moves up to lift the pallets P1, P2 from the table 5, turns 180 degrees in this state, and thereafter moves down. Through this operation, the preceding process pallet P1 and the subsequent process pallet P2 are placed at the workpiece standby position B and on the table 5 at the workpiece change position C respectively.

According to this embodiment, the column 3 is in the gate shape in which the beam 3b connects the tops of the right and left legs 3a, 3a, and is fixed on the top faces of the right and left vertical walls 2a, 2a of the fixed bed 2, being bridged over the travel range of the table 5, which allows the table 5 to move in the X-axis and Y-axis directions through the opening A under the column 3. This enables the arrangement of the spindle shaft 6 on the column 3 without any overhang. As a result, the allowable acceleration/deceleration value of the spindle head 6 at the Z-axis direction feed time can be increased. In accordance therewith, the feed rate can be increased to shorten the machining time, resulting in improved productivity.

Moreover, since the overhang of the spindle head 6 can be eliminated, it is possible to eliminate the influence to machining accuracy and eliminate the need for increased stiffness of the column 3 more than necessary, resulting in reduced cost and weight.

Since the beam 3b of the column 3 is positioned at the center portion of the fixed bed 2 in terms of the Y-axis direction, it is possible to set the Y-axis direction dimension of the fixed bed 2 substantially equal to the Y-axis stroke amount of the table 5. This structure can make the overall machine compact compared with the conventional structure in which the column is disposed on the back end of the bed.

Further, the beam 3b of the column 3 is displaced toward the back face side of the machine so that the front face 3b' of the beam 3b substantially coincides with the leg center line C1 of the right and left legs 3a, 3a, and the axis of the spindle head 6 substantially coincides with the center line C1 of the legs 3a. This structure can eliminate the overhang of the spindle head 6 from the right and left legs 3a. Accordingly, it is possible to further increase the allowable acceleration/deceleration value of the spindle head 6, so that the feed rate can be further increased.

Moreover, since the right and left legs 3a are inclined so that the upper portions 3b are positioned closer to the spindle head 6, the length in the X-axis direction of the beam 3b can be shortened. Accordingly, the overall column can have increased stiffness and can be made compact.

Further, the ends 18c of the respective rails 18a of the X-axis guide rails 18 are positioned in the recessions 2d of the vertical walls 2a of the fixed bed 2, so that it is possible to suppress the increase in width dimension of the machine body while securing the travel amount in the X-axis direction of the table 5.

According to this embodiment, the automatic tool changer 10 is disposed on the back face 3b" side of the column 3 formed in the gate shape, and it replaces the preceding working tool T on the spindle 7 side by the subsequent working tool T1 on the tool magazine 11 side through the opening A that allows the back face 3b" side and the front face 3b' side of the column 3 to communicate with each other, so that the vacant space of the back face 3b" of the column 3 can be utilized for placing the tool magazine 11, which can prevent the increase in the width dimension of the machine.

Since the column 3 is in the gate shape bridged over the travel range of the table with the beam 3b connecting the tops of the right and left legs 3a, the machining opening A formed under the column 3 can be effectively utilized for tool replacement. This can eliminate the need for a tool change space and can make the overall machine compact.

Further, the beam 3b of the column 3 is displaced from the right and left legs 3a toward the back face side of the machine and is disposed at the center portion of the fixed bed 2 in terms of the Y-axis direction, so that the vacant space on the back face 3b" side of the beam 3b can be effectively used for placing the tool magazine 11 and the overall machine can be made compact.

Moreover, the change arm shaft 28 vertically passes through the beam 3b, and the tool transfer mechanism 25 is parallel to the change arm shaft 28, so that it is possible to dispose a tool change unit such as the change arm shaft 28 and the tool transfer mechanism 25 with reduced required arrangement space.

According to this embodiment, the column 3 is in the gate shape bridged over the travel range of the table 5, the workpiece standby position B is set outside the machine on the back face side of the fixed bed 2, and the workpiece change position C is set under the column 3. Accordingly, it is possible to utilize the machining opening A under the column 3 for arranging the turn-type workpiece changer 12 on the back face side of the fixed bed 2. This structure realizes easy approachability to the spindle 7 from the front side of the bed 2 and improved work efficiency of maintenance.

Further, the column 3 is in the gate shape with the beam 3b connecting the tops of the right and left legs 3a, so that it is possible to effectively utilize the machining opening A under the column 3 for disposing the workpiece changer 12, which can make the overall machine compact.

In addition, since the beam 3b is displaced from the right and left legs 3a toward the back face side of the machine and is positioned at the center portion of the fixed bed 2 in terms of the Y-axis direction, it is possible to secure a turn space for workpiece replacement in the center portion of the bed and to further improve approachability to the spindle 7 from the front side of the bed.

Further, the workpiece standby position B is set outside the machine on the back face side of the fixed bed 2 and the turn shaft 37 is disposed on the back end of the fixed bed 2, the workpiece attaching/detaching operation can be facilitated and the increase in installation area of the workpiece changer 12 can be suppressed.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising: a bed; a saddle disposed on said bed to be movable in a forward and backward (Y-axis) direction in a front view of the machine tool; a table disposed on said saddle to be movable in right and left (X-axis) direction; a column in a gate shape that is bridged over a travel range of said table and has right and left legs fixed on said bed and a beam connecting tops of the right and left legs, the right and left legs having an identical shape and the beam being displaced from the right and left legs toward a back face side of the machine tool; a spindle head disposed on said column to support a spindle and movable in a vertical (Z-axis) direction; an automatic tool changer disposed on a back face side of said column, wherein said column has an opening which allows the back face side and a front face side of said column to communicate with each other, wherein the beam includes a recess on the front face of the beam for housing said spindle head, and wherein said automatic tool changer replaces a tool on said spindle side by a tool on a tool magazine side through the opening.

2. The machine tool according to claim 1, wherein said automatic tool changer is disposed on a back face side of the beam of said column and passes under a lower edge of the beam to replace the tool on said spindle side by the tool on the tool magazine side.

3. The machine tool according to claim 2, wherein the beam of said column set above said bed at a substantially center portion of said bed in terms of the Y-axis direction.

4. The machine tool according to claim 3,
wherein said automatic tool changer includes: a tool magazine disposed on the back face of the beam of said column; a change arm shaft vertically passing through the beam; a change arm turnably connected to a lower end of the change arm shaft; a change arm turn driving unit connected to an upper end of the change arm shaft; and a tool transfer mechanism disposed in parallel to the change arm shaft to transfer a tool between the tool magazine and the change arm.

5. The machine tool according to claim 2,
wherein said automatic tool changer includes: a tool magazine disposed on the back face of the beam of said column; a change arm shaft vertically passing through the beam; a change arm turnably connected to a lower end of the change arm shaft; a change arm turn driving unit connected to an upper end of the change arm shaft; and a tool transfer mechanism disposed in parallel to the change arm shaft to transfer a tool between the tool magazine and the change arm.

* * * * *